US007386859B2

(12) United States Patent
Sandadi et al.

(10) Patent No.: US 7,386,859 B2
(45) Date of Patent: Jun. 10, 2008

(54) METHOD AND SYSTEM FOR EFFECTIVE MANAGEMENT OF CLIENT AND SERVER PROCESSES

(75) Inventors: Upender Sandadi, Issaquah, WA (US); David Bakin, Seattle, WA (US); Andrew L. Nicholson, Duvall, WA (US); David Sauntry, Redmond, WA (US); Marc Shepard, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 630 days.

(21) Appl. No.: 10/156,463

(22) Filed: May 28, 2002

(65) Prior Publication Data

US 2003/0225870 A1 Dec. 4, 2003

(51) Int. Cl.
G06F 3/00 (2006.01)
G06F 9/44 (2006.01)
G06F 9/46 (2006.01)
G06F 13/00 (2006.01)
G06F 15/16 (2006.01)
G06F 15/173 (2006.01)

(52) U.S. Cl. ............... 719/315; 719/316; 709/203; 709/223; 709/225; 709/226; 709/229; 718/104

(58) Field of Classification Search ........ 719/318, 719/315, 316; 709/203, 223–229; 718/104
See application file for complete search history.

(56) References Cited

U.S. PATENT DOCUMENTS 5,907,675 A * 5/1999 Aahlad .................. 709/203

| | | | |
|---|---|---|---|
| 6,182,246 B1 * | 1/2001 | Gregory et al. ........... 714/38 |
| 6,381,628 B1 * | 4/2002 | Hunt .................... 709/201 |
| 6,381,653 B1 * | 4/2002 | Feray et al. ............. 719/315 |
| 6,640,238 B1 * | 10/2003 | Bowman-Amuah ....... 709/201 |
| 7,043,733 B2 * | 5/2006 | Limprecht et al. ........ 719/315 |
| 7,043,734 B2 * | 5/2006 | Limprecht et al. ........ 719/315 |

(Continued)

OTHER PUBLICATIONS

"IStdMarshallInfo" Microsoft, retrieved at http://msdn.microsoft.com/library/en-us/com/htm/cmi_q2z_99tb.asp?frame=true, Jun. 22, 2004 (1 page).

(Continued)

Primary Examiner—Li B. Zhen
Assistant Examiner—Qing-Yuan Wu
(74) Attorney, Agent, or Firm—Woodcock Washburn LLP (57) ABSTRACT

Methods, functional components and structures are disclosed for carrying out management of client/server processes operating within separate process spaces within a computer system. The disclosed methods, functional components facilitate and carry out management of client and server processes within a computer system such that a greater degree of control can be exhibited over their execution. An active server component process maintains a list structure identifying each client process that is currently using one of the server component process's interfaces. When a new client references a server, the list structure is augmented to include the system identification (e.g., handle) assigned by the operating system to the client process. A thread within the server process blocks while awaiting a triggering event (e.g., a client process in the list terminates). When the client process terminates, the block on the thread releases and the thread processes the change in client references. If the list of clients within the structure reaches zero, then the server process can immediately terminate.

37 Claims, 5 Drawing Sheets

U.S. PATENT DOCUMENTS

| | | | |
|---|---|---|---|
| 7,062,770 B2* | 6/2006 | Limprecht et al. | 719/315 |
| 7,076,784 B1* | 7/2006 | Russell et al. | 719/315 |
| 2001/0054157 A1* | 12/2001 | Fukumoto | 713/201 |
| 2002/0184313 A1* | 12/2002 | Bedos et al. | 709/205 |

OTHER PUBLICATIONS

Grimes, "Marshaling Your Data: Efficient Data Transfer Techniques Using COM and Windows 2000," MSDN Magazine, Sep. 2000 (16 pages).

* cited by examiner

METHOD AND SYSTEM FOR EFFECTIVE MANAGEMENT OF CLIENT AND SERVER PROCESSES

FIELD OF THE INVENTION

This invention generally relates to the area of computer systems and software. More particularly, the present invention concerns protocols for managing the lifetimes of multiple cooperatively operating software components that are created/instantiated within their own distinct process spaces. Such components embody lifetimes and operating behaviors that can be independent of the other components with which they interact. A particular example of such software components are Component Object Model (COMA) components that are instantiated and execute within a COM runtime environment supported by a MICROSOFT WINDOWS operating system.

BACKGROUND OF THE INVENTION

A computer software architecture is a general term that includes defining the way in which software applications are developed, deployed and executed upon computer systems. The computer systems include both the hardware and the operating system that facilitate execution of the software. One such software architecture, of which MICROSOFT's COM/COM+ is a particular well-known example, embodies a component approach to development, deployment, and execution of computer software. In a component-based software approach, an application executable comprises a set of building blocks, or components, that are defined by an interface and a set of functions (e.g., methods) rendered by the component via the interface. In the case of COM/COM+ components, the COM object components (including methods and/or data) are compiled into binary executable modules. The components, depending upon their mode of deployment (i.e., in-process or out-of-process) are deployed as either .DLL files (in-process) or .EXE files (out-of-process). The present invention concerns the out-of-process form of software component.

All components are not required for particular executions of an application. Thus, the components are dynamically created (e.g., instantiated) during the course of execution of an application. For example, a server component object is loaded and a process space created for the server component (e.g., COM server) by the operating system in response to a particular call from an executing client component (e.g., COM client) for a service rendered by the server component. It is noted that in the context of the present invention, a client component can also represent itself to other components as a server. Thus, the present invention is applicable to client-server, peer-to-peer, and hybrid environments where clients represent themselves to other components as servers.

Once created, the components consume computing resources (e.g., CPU time, RAM, etc.). Thus, where many components are actively competing for a limited set of computing resources, a criteria should be imposed upon the components to restrict their execution, including when they are purged from the active process space of a computer system. If the components are not currently needed, then they should be removed from the active process space of a computer system to free up resource consumed by the unneeded components. Furthermore, not all components are of equal importance within a computing environment. Thus, component management mechanisms have been implemented for determining when a particular component is not presently needed, and then removing the component from the active process space of a computer system. In particular, known component management schemes detect when a server component (e.g., a local out-of-process COM server) is no longer referenced by any client components, and then purge the server component from the active process space.

Known component object arrangements (i.e., COM/COM+) utilize reference counters to facilitate monitoring the number of COM client components using particular COM server component interfaces. A COM server executable is launched in response to a first request by a COM client and a reference counter for the COM server's referenced interface is incremented to reflect the use. When the reference counter for a particular COM server interface reaches zero, the COM server component is able to delete objects that are only serving the particular interface. Furthermore, when the reference counters for all interfaces of the COM server reach zero, the COM server shuts down, thereby returning consumed resources to a computer system upon which it executes.

Two known schemes are currently used to shutdown a COM server at an appropriate time after it is determined that no clients are presently using one of its interfaces. The first scheme requires the COM servers and clients to increment and decrement an interface reference counter to reflect the clients' use of the COM servers' interfaces. This procedure utilizes the well known AddRef and Release methods on the COM server interface. When a client requests an COM server's interface, the server increments the reference counter by calling the AddRef method. When a client currently referencing an interface no longer requires use of the interface, the client calls the Release method on the COM server's interface to explicitly end the connection. The Release method decrements the reference count for the referenced interface. Thus, when all clients have explicitly released their references to the interfaces to provided by the COM server, all the interface reference counts equal zero and the COM server can shut down.

There are at least two shortcomings to the above-described scheme. First, if a client does not explicitly release the reference to an interface (e.g., the client process freezes and is killed by the operating system), the release command is never sent. A period of time can lapse before the absence of the client is registered, and thus a COM server can reside in the active process space well after the clients that referenced it have terminated. In a particular example, a COM ping timeout mechanism involving a server process stub and client process proxy exchange ping packets every two minutes. If the stub experiences three failed ping attempts with the client proxy, then the server releases all interfaces associated with the particular client. Second, if the client process is improperly programmed and terminates without calling the Release method, then the same undesirable result is achieved as the first shortcoming.

The second known scheme relies upon a COM Runtime system interface, i.e., IExternalConnection to increment/decrement interface connections. COM Runtime makes the first call to the interface when the server is initially called by a client component. A stub manager on the server process including the COM server calls the COM server to add/release connections to clients and thus increment/decrement the reference counters. When the external reference count reaches zero, the server object explicitly calls a disconnect method on itself. Thereafter, the stub manager of the server process calls a release method on the server object to destroy it. If COM client shuts down normally, but is unaware of the reference release function, an "uninitialize" call known by all COM clients will trigger the server to call the reference release method. The second approach handles the case of the unaware COM client. However, the second approach does not handle the instances where a client crashes before "uninitializing."

The above examples exhibit just one of many shortcomings of the prior art with regard to the general lack of management capability of a server process over the client processes that reference its interfaces.

SUMMARY OF THE INVENTION

The present invention comprises method and application program infrastructure for managing client and server component-based processes to ensure desirable consumption of limited computer system resources. In particular, the infrastructure facilitates executing a set of steps responsive to changes in client processes that reference a particular server. The infrastructure includes a list maintained by the server including client identifications corresponding to the client processes. In response to receiving an initial request from a client process for a service provided by the server process, a client process identification corresponding to the client process is added to the list. At a later time, in response to receiving a notification that the client process has terminated, the client process identification corresponding to the client process is removed from the list. The infrastructure and method also includes performing a process management operation in response to a change to the list. Such management operations include, by way of example, and not limitation, initiating shutting down the server process when a change to the list comprises removing a last client process identification. Another illustrative example of a management operation comprises enforcing a concurrent user license when a change to the list comprises adding a new client process identification.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

In an embodiment of the present invention a computer implements a set of steps described herein for managing client processes in, by way of example, a component object-based application program environment. The steps are performed, at least in part, by executing software instructions, such as program modules. Generally, program modules include routines, objects, components, data structures and the like that facilitate performing particular tasks or implementing particular abstract data types. The term "program" includes one or more program modules.

Figure 1:
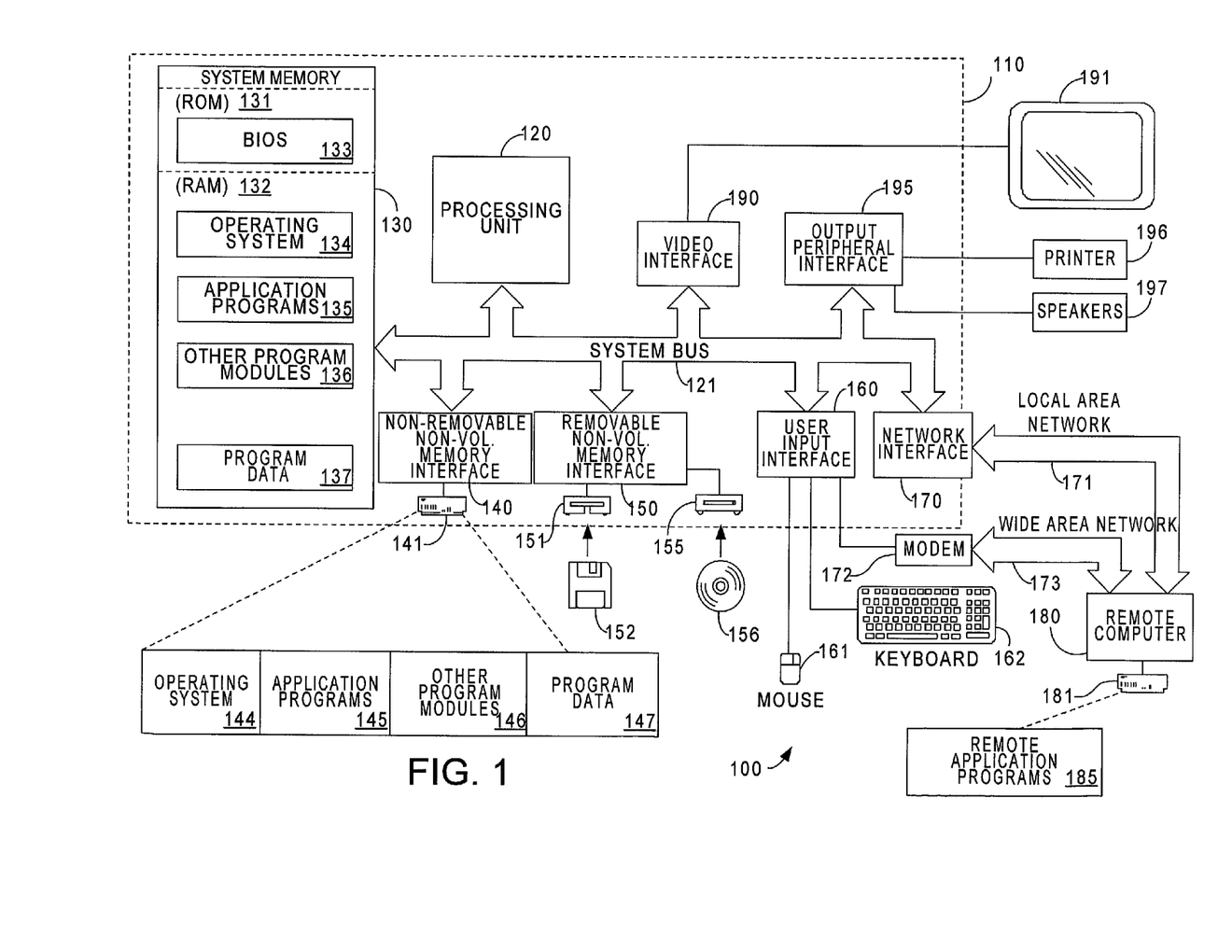
FIG. 1 is a simplified schematic illustrating an exemplary architecture of a computing device upon which at least portions of the test matrix generation/execution method/program modules of the invention are executed.

FIG. 1 illustratively depicts an example of a suitable operating environment 100 for carrying out at least a portion of the process for managing client and server processes in a component object-based software system. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
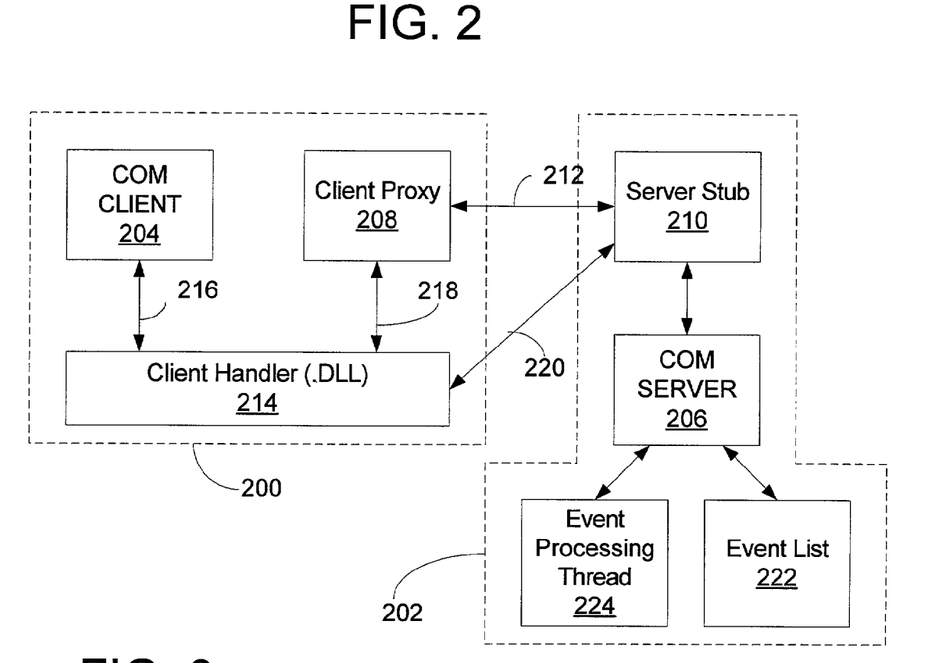
FIG. 2 is a high level schematic diagram depicting the primary components of a server process and client process, as well as a set of connections between the two processes that facilitate carrying out an embodiment of the present invention.

Turning now to FIG. 2, a schematic diagram depicts components within an exemplary client process 200 and server process 202 executing in a local environment (i.e., a single computer system). However, the present invention is not limited to local, out-of-process servers. Thus, in alternative embodiments, the server and client processes execute on separate systems and communicate via, for example, remote procedure calls.

In accordance with an exemplary embodiment of the invention, the client process 200 and server process 202 execute in a MICROSOFT COM/COM+ environment. In such environment, client processes and server processes are dynamically maintained in active process space only as long as they are active or needed by other processes. Thus, the server process 202 is not loaded until a first client, such as the client process 200 issues a call for a service rendered by one of potentially many interfaces supported by the server process 202. In response to the service request, COM Runtime, a component of the MICROSOFT WINDOWS operating system, loads the server process 202 within a separate process space. The server process 202 provides its interface to the client process 200. Under proper operating conditions, when the client process 200 no longer desires use of the interface provided by the server process 202, it releases the interface. If the released interface is the last reference from a client to the server process 202, then the server process 202 shuts down, thereby releasing any resources tied up by the server process 202.

The above general, high level description of the client and server processes is described in greater detail herein below. Furthermore, it is noted that while FIG. 2 depicts only a single client process 200, the COM/COM+ application program environment contemplates, and indeed is likely to include, multiple clients using potentially multiple distinct interfaces provided by the server process 202.

FIG. 2 depicts the components of fully constructed server and client processes maintained within their own distinct process spaces. Inter/intra process communication paths between the displayed components are also depicted. The steps for incorporating the components and communication paths into the client process 200 and server process 202 are described herein below with reference to FIG. 3.

Turning first to the client process 200, a COM client component 204 is the primary executable within the client process 202 and is loaded, by way of example, from an EXE file. Once loaded by the operating system, the COM client component 204 carries out the functionality of an application program (e.g., Platform builder, or PB.EXE) including rendering requests for services provided by a COM server component 206. Such requests are received by COM Runtime and result in the instantiation of the COM server component 206. The COM server component 206 is loaded from an EXE file (e.g., Platform manager, or cemgr.exe) by COM Runtime and supplies a set of requested services to client components such as the client component 204 via provided interfaces.

A client proxy 208 and a server stub 210, also loaded in response to the COM client 204's request for an interface to the COM server 206, are responsible for communicating requests and responses between the client process 200 and server process 202. Such communications are carried out via a communication interface 212 established in response to the initial call by the client process 200 for a service provided by a service rendered by the server process 202.

An exemplary client/server component model, upon which the arrangement depicted in FIG. 2 is based, includes a client handler 214. In the exemplary embodiment of the invention, the client handler 214 is a dynamically linked library (DLL) file. The particular DLL file identity for the client handler 214 is obtained, in an embodiment of the invention, by calling the standard IStdMarshallInfo interface provided by the COM server component 206. Since the client handler 214 is dynamically loaded at the time the COM client component 204 requests an interface to the COM server component 206, it is possible to make changes to the client handler 214 executable code, and thus modify the operation of the client process 200, after the COM client component 204 has been installed within a user's computer system. In particular, as demonstrated by the illustratively depicted embodiment, the client handler 214 facilitates carrying out client-server protocol changes in a dynamically loaded component (e.g., the client handler 214). This feature facilitates protocol changes without making changes to installed COM client component software.

Once the client handler 214 is dynamically installed within the client process 200, request and response communications between the COM client component 204 and the COM server component 206 pass via communication interface 216 between the COM client component 204 and the client handler 210. The client handler 214 passes requests from the COM client 204 and receives server responses from the client proxy 208 via communications interface 218 between the client proxy 208 and the client handler 214.

In accordance with an exemplary embodiment of the invention, once loaded, the client handler 214 initiates, via a special purpose interface 220 provided by the server stub 210, a client process registration procedure to add a client process reference to an event list 222 that includes, among other event identifications, a list of client process references (e.g., handles) corresponding to client processes that are presently using an interface provided by the COM server component 206. In alternative embodiments, the list 222 includes only client process references. In yet other embodiments, multiple event lists process various events within the process space of the server process 202. The term "list" as used herein should be interpreted broadly to include a wide variety of memory structures (e.g., arrays, linked lists, strings, etc.) capable of storing a set of identifications such that the identifications can be referenced at a later time. The event list 222 is used to wake up an event thread 224 within the COM server component 206 that is associated with an extensible set of management functions performed by the server process 202. The types of events processed by the event thread 224 include, by way of example: adding a new client process, terminating an existing client, and shutting down the server process (when all client processes have released all references to the COM server 206). In response to detecting an event identified within the list 222, the event thread 224 wakes up, processes the associated management operation, and then re-enters a blocking "wait" state. The event list 222 and the associated event processing thread 224 are described in more detail herein below with reference to FIG. 3.

Figure 3:
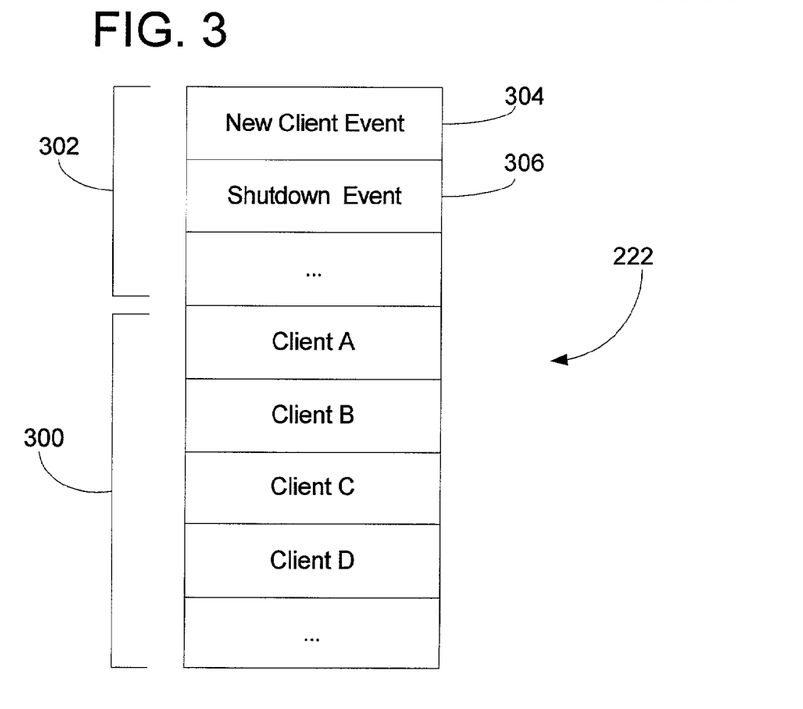
FIG. 3 is a schematic diagram of a list structure that is utilized to track/manage client processes in accordance with an embodiment of the present invention.

Having described the primary functional components of a component object-based client-server arrangement embodying the present invention, attention is directed to the exemplary extensible event list 222 structure including a set of client identifications handles. In particular, FIG. 3 is a schematic diagram of the event list 222 that, in association with the event processing thread 224 executing within the COM server component 206, is utilized to track/manage client processes in accordance with an embodiment of the present invention. The list 222 and event processing thread 224 carry out an extensible set of management operations associated with the client processes that request services provided by the COM server component.

One such management operation, described in detail herein below, ensures that the server process 202 promptly shuts down after all client processes that have been provided an interface to the server process 202 have shut down. However, the event list 222 is used by the COM server component 202 to process any of a variety of events arising from the COM server component 206 and calling client processes that have requested any one of the interfaces provided by the server process 202.

In the exemplary embodiment of the invention, the event list 222 includes a set of system-level client process identifications (e.g., handles) 300 corresponding to a set of client processes that currently have active references to the COM server 206. During the life of the server process 202, the client identifications portion 300 of the event list 222 expands to accommodate adding client process handles as the client processes initially obtain one of the interfaces provided by the COM server component 206. The COM server 206 removes client process handles from the client process identifications 300 when a corresponding client process terminates. After removing a corresponding entry from the client identifications 300, if there are no other client processes identified in the list 222, then the event processing thread 224 initiates a server process shut down procedure.

An extensible management event identifications 302 portion supports a set of event-driven management operations performed by the COM server component 206. A new client event 304 is generated each time a new client process requests an interface provided by the COM server component 206. This, in turn awakens the waiting event processing thread 224 that, in turn, establishes a new wait state based upon an updated client identifications portion 300 (due to the new client identification). A shutdown event 306 is generated by the COM server component 206 when all the client references to the COM server component 206 have been released. The shutdown event 306, like the situation where all client processes in the client process identifications 300 have terminated, results in the COM server component 206 executing a shut down sequence when the event processing thread 224 awakens.

Having described a set of events tracked by the event list 222, it is again noted that the types of events represented within the list, and the breadth of operations performed by the blocking, event driven, event processing thread 224 in response to an event firing, is by no means limited to the above examples. For example, in an embodiment of the invention, the COM server component 206 enforces a concurrent licensing scheme based upon the number of client processes that are currently accessing one of the interfaces provided by the COM server component 206. Thus, each time the new client event 304 fires, the event processing thread 224 determines the number of client processes identified in the client process identifications 300, and enforces a pre-set limit. In yet another scheme, priorities are enforced based upon the client process identifications provided by the operating system. The system-level identifications provided by the operating system and stored in the client process identifications provide the basis for the enhanced client process management capabilities associated with the event processing thread 224 in association with the event list 222 described, by way of example, herein above.

Figure 4:
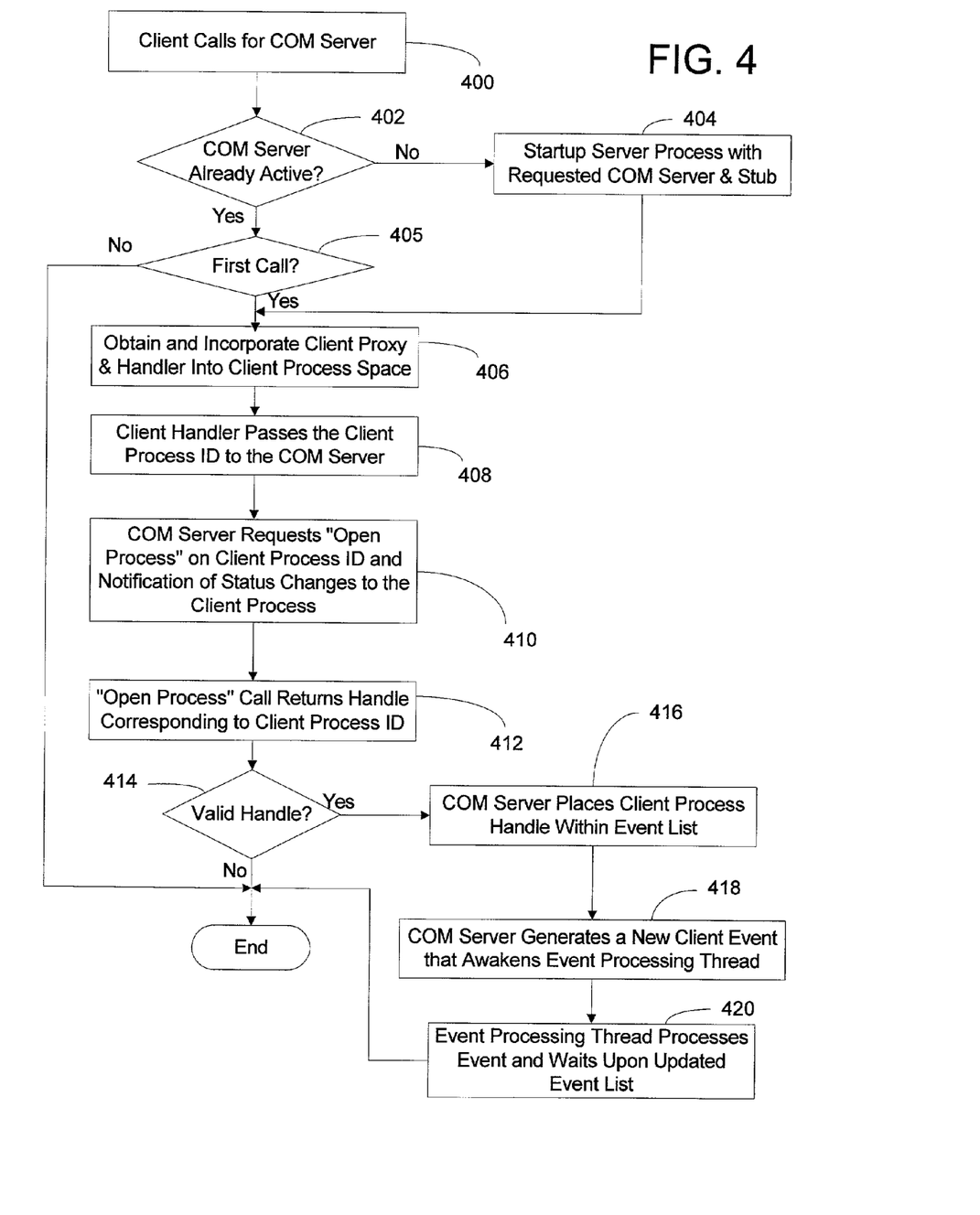
FIG. 4 is a flowchart summarizing a set of steps performed in response to a client process initially requesting use of a server component interface in accordance with an particular embodiment of the present invention.

Turning now to FIG. 4, a flowchart summarizes a set of steps performed in response to a client process initially requesting a COM server component interface in accordance with an particular embodiment of the present invention. The depicted steps focus primarily upon the client identification registration process rather than the well known steps to establish an interface between a client and server process in accordance with COM protocols.

Initially, at step 400 a COM client component (e.g., COM client 204) invokes a service provided by a COM server component (e.g., COM server 206). An exemplary call to invoke the COM server component is a CoCreateInstance call to COM Runtime. The CoCreateInstance call includes: the class ID of the COM server, the requested interface, and a pointer to the calling client process.

If at step 402, the COM server 206 is not yet running, then control passes to step 404 wherein COM runtime instantiates the COM server 206 within the server process 402. The stub 210 is loaded in the server process 202. Control then passes to step 406.

Alternatively, if the COM server 206 is already running, then control passes directly to step 405. In an embodiment of the invention, the client handler 214 is registered as the manager for the client proxy 208. All client process 200 calls initiating a connection (e.g., QueryInterface calls) from the client process 200 to the server process 202 are trapped by the client handler 214. Furthermore, the client process 200 needs to register in the event list 222 only once. Therefore, at step 405, if this is not the first call by the client process 200 to the server process 202, then the client process 200 already performed the subsequent startup steps and is registered in the event list 222. In this case, the client handler 214 is merely a pass-through agent and the request is passed to the client proxy 208. Thus control passes to the End of the startup/registration procedure summarized in FIG. 4. If however, the client process 200 has not previously registered, then control passes to step 406.

At step 406, in an embodiment of the invention, COM Runtime calls the GetClassForHandler method on the IStdMarshallInfo interface of the COM server 206 to obtain the DLL file for the client handler 214. Thereafter, COM Runtime activates/loads the client proxy 208 and the client handler 214 within the client process 200.

After the client handler 214 has been activated and loaded into the client process 200, at step 408 the client handler 214 determines the client process identification, and then passes the client identification to the COM server 206. In a particular embodiment of the invention, the client handler 214 passes the client identification by invoking the SetClientProcessID method on the IClientInfo interface of the COM server 206. The SetClientProcsID method call includes at least the client process 200's process identification.

Having received the client process 200's identification, the COM server 206 now possesses a means for tracking the state of the client process 200. However, the COM server 206 has not yet established an automatic notification mechanism for tracking the state of the client process 200. Thus, in an embodiment of the present invention, at step 410 the COM server 206 initiates setting up an automatic notification mechanism that enables the COM server 206 to receive a notification from the operating system when the status of the client process 200 changes (e.g., the process terminates). Those skilled in the art will readily appreciate many potential ways in which an automatic notification mechanism can be established in view of the disclosure herein. In the MICROSOFT WINDOWS operating system environment, such automated event notification is achieved by the COM server 206 issuing an OpenProcess request including the client process 200's identification passed to the COM server 206 during step 408. The OpenProcess request includes a "synchronize" flag requesting the operating system to notify the COM server 206 of any status changes to the identified client process (e.g., the client process terminates).

At step 412 the OpenProcess call returns, to the COM server 206, the currently opened handle referencing the client process 200. At step 414, if the handle is valid and not already in the event list 222 (i.e., the client process 200 is indeed a new process accessing the COM server 206 for a first time), then control passes to step 416. At step 416 the COM server 206 adds the received client process handle to a new entry within the event list 222. At a later time when the client process 200 terminates, the operating system issues an event message including the handle for the client process 200, thereby notifying the COM server 206 that the client process 200 should be removed from the event list 222. Such notification occurs without substantial delay, and thus hastens shutdown of the COM server 206 in the case where the client process 200 was the last client process represented in the event list 222.

In an embodiment of the invention, the event list 222 is utilized to wake the blocking event processing thread 224. Thus, after adding the new client process handle to the event list 222 the blocking event processing thread 224 activates to update the list of events upon which it waits, and then the thread 224 waits upon the updated event list. Thus, in accordance with an embodiment of the present invention, at step 418 the COM server 206 generates a "new client process" event as part of the processing of a new client process reference being added to the list. In particular, the COM server 206 issues a SetEvent( ) function call to the WINDOWS operating system and includes within the call a handle previously assigned by the operating system to the "new client process" event. At step 420, the event processing thread 224 processes the new client event. In this particular described embodiment, the client handle has already been added to the list, and therefore, the event processing thread 224 merely resets the set of events upon which it waits (to accommodate the newly added client process handle) and then re-enters its waiting state. Control then passes to the End. However, in other embodiments, the processing code is supplemented to enforce any desired protocols or licensing limitations incorporated into the COM server 206. Such supplemental operations include, by way of example, enforcing a concurrent license limitation, a process priority scheme, etc. Other exemplary management operations include detecting for possible tampering by/with client executables and restricting resource usage by a client.

On the other hand, if the client process handle returned at step 412 is not new, then there is no need to update the event list 222. Such instances may occur where the client process 200 releases all of its references to the server 202, but later re-initiates access after the interfaces have been broken down. In such instances, steps 416, 418 and 420 are by-passed and control passes directly to the End of the new client processing procedure summarized in FIG. 4.

Having described and exemplary set of steps for adding a new client process to the event list 222, a set of steps are described for processing an event corresponding to termination of a client process referenced in the event list 222. The client termination event processing method described herein below with reference to FIG. 5 updates the list of client handles in the event list 222, and initiates shutting down the server process 200 if no client references remain in the event list 222. The sequence of steps begins at step 500 wherein the client process 200 terminates. Such termination can arise from the client process crashing or merely terminating in a normal course of operation.

Figure 5:
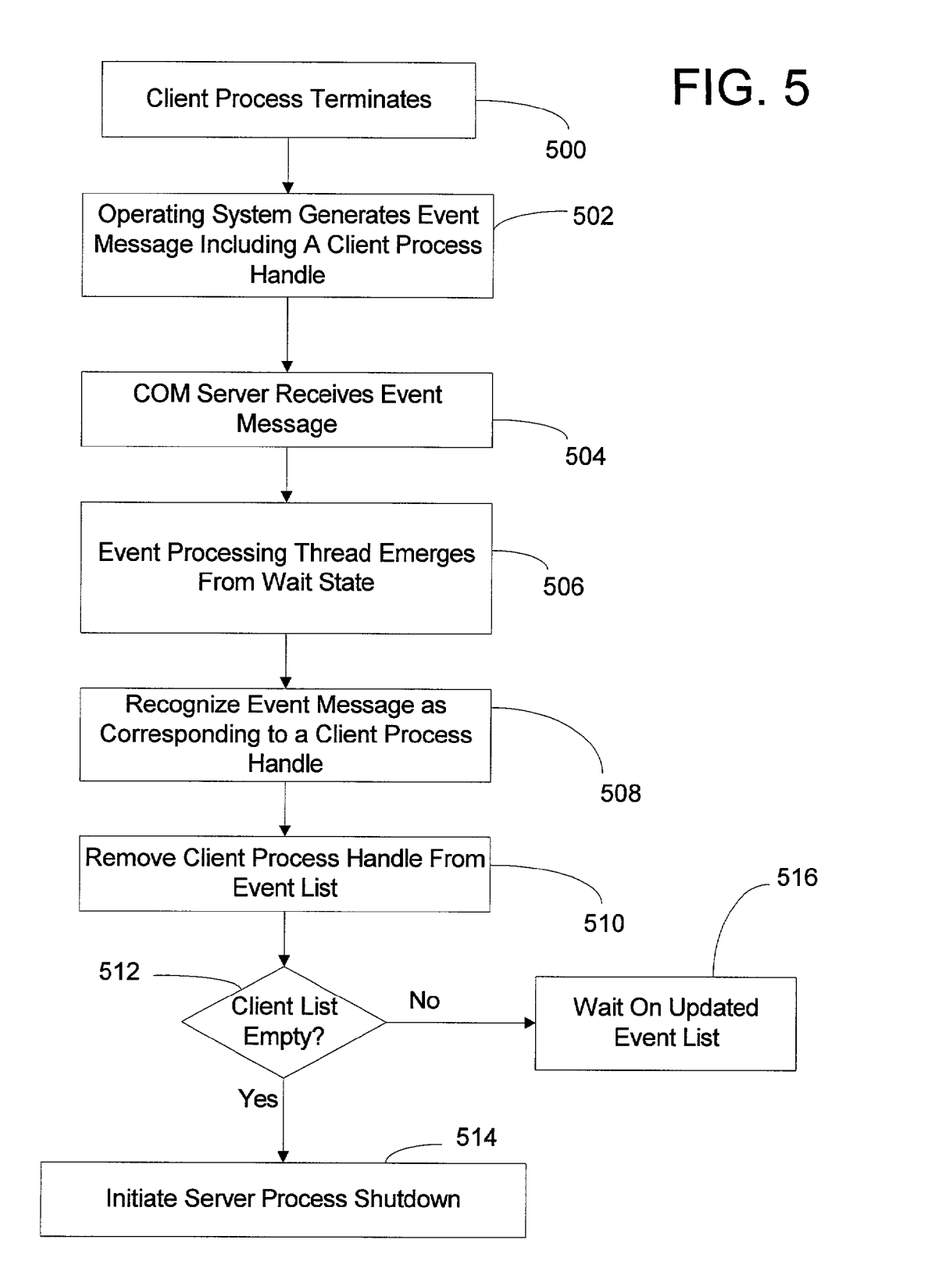
FIG. 5 is a flowchart summarizing a set of steps performed in response to a client process shutting down in accordance with an embodiment of the present invention.

In response, during step 502 the operating system generates an event message, including the handle previously assigned the client process during step 412. In the context of the MICROSOFT WINDOWS operating system, this notification mechanism is established by the COM server 206 previously asserting the "synchronize" flag during the Open-Process call (at step 410).

During step 504 the COM server 206 receives the event message including a handle corresponding to the client process 200 and contained in the event list 222. In response, at step 506 the blocking event processing thread 224 emerges from its wait state to process the received event—in this case a client process termination event. At step 508 the event processing thread 224 locates the received handle in the event list 222, and then at step 510 removes the entry corresponding handle from the client identifications 300.

After removing the client handle, control passes to step 512 wherein the event processing thread 224 determines whether the server process 202 can shut down. In the exemplary embodiment of the invention, such test involves a determination of whether the client identifications 300 portion of the event list is empty (i.e., all client processes that previously referenced the server process 202 have terminated). If the client identifications 300 portion is empty, then control passes to step 514 wherein the event processing thread 224 initiates a server process shutdown procedure. On the other hand, if additional client handles still exist in the client identifications 300, then control passes from step 512 to step 516 wherein the blocking event processing thread 516 re-enters the wait state on the event list 222 that was updated during step 510 by removing a terminated process.

During the course of describing the sequences of steps concerning adding and removing client identifications to the event list 222 in response to client processes initiating a first connection to a server process and termination of the connected client processes client handles/identifications, reference was made to the blocking event server 224. An exemplary program structure for the event server 224 is set forth with reference to FIG. 6. It is noted that the types of events are not limited to those identified in FIG. 6, and instead can include virtually any type of event/management operation that the COM server 206 is capable of handling.

Figure 6:
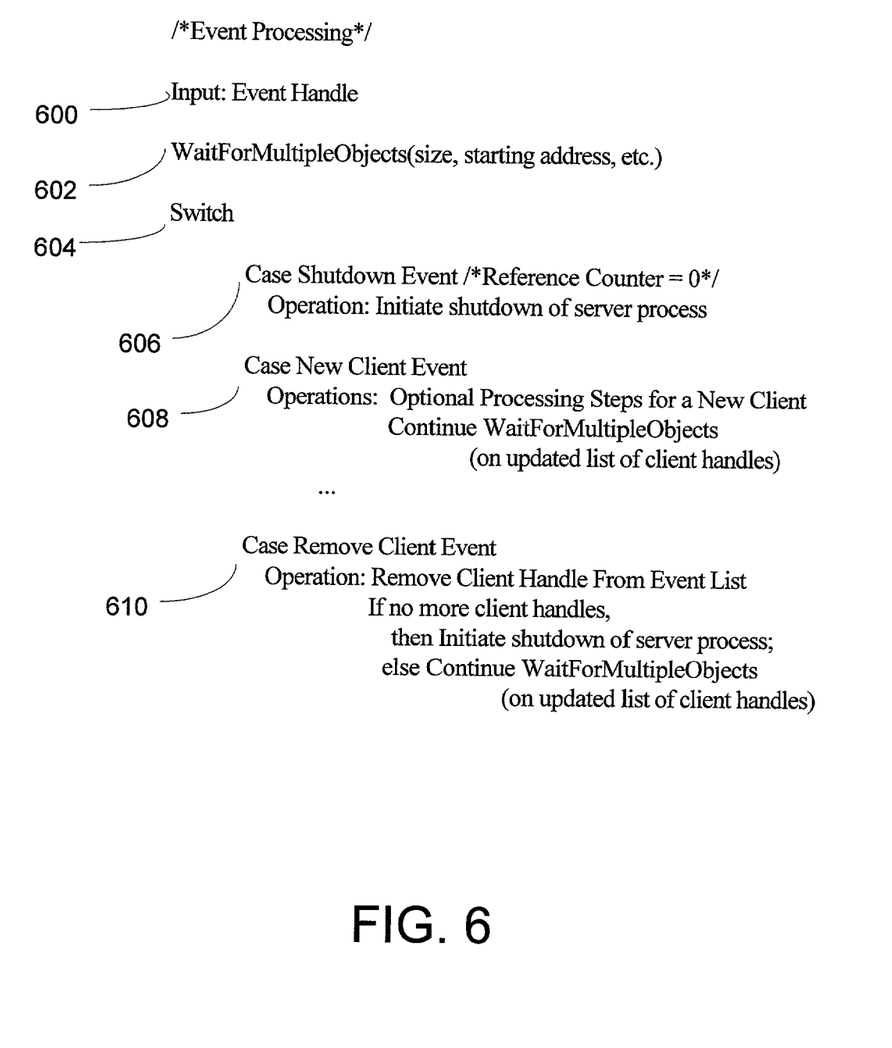
FIG. 6 is an exemplary outline for a blocking event processing thread utilized to respond to a set of events associated with the contents of the event list structure depicted in FIG. 3.

The Input 600 to the blocking thread includes a handle. The input handle represents the event, registered by the operating system, that causes the blocking event processing thread to emerge from an open-ended (i.e., potentially infinite) wait state. A first operation performed by the event processing thread 224 is a blocking operation 602. In a particular embodiment of the invention, such blocking is achieved by invoking the MICROSOFT WINDOWS operating system level WaitForMultipleObjects call. The set of passed parameters includes the starting address of the list of events 222 upon which the thread 224 will wait and the size of the event list 222. Other parameters instruct the operating system to hold the thread in the wait state for a potentially infinite period and to emerge from the wait state when a change notification is rendered with regard to one of the handles in the event list 222.

The structure is rather straight-forward in the sense that the remainder of the thread structure includes a switch 604 (e.g., case instruction) that executes one of multiple different sets of instructions based upon the type of event that caused the thread to emerge from the wait state. In the exemplary embodiment, a "Shutdown" type event 606 arises when all references by client processes to the server process 202 have been released (i.e., the client reference count on each interface provided by the COM server 206 equals zero). The shutdown type event 606 differs from an empty client process list 300, since client processes may remain in operation after releasing all references to the server 202. In such case, the portion of the thread 224 that is responsive to client process shutdown events (i.e., a Remove Client type event 610) would not be invoked. When the shutdown type event 606 is invoked, the COM server component 206 initiates a shutdown procedure on the server process 202.

Next, a New Client Event 608 arises from a client reference being added to the list of client handles maintained in the event list 222. Since the list has already been modified by the COM server 206 prior to issuing this event, in an embodiment of the invention, no further actions are required other than to call the WaitForMultipleObjects and return the thread 224 to its wait state on the event list that is now updated to include the new client handle. However, additional management operations are included in alternative embodiments of the invention. One such example is a test of the number of clients represented in the event list, and enforcing a concurrent license that limits the number of concurrent users. This operation optionally includes enforcing a priority scheme to disconnect a lowest priority client process when the number of clients exceeds the license limit.

A Remove Client Event 610 arises whenever a client process represented in the set of client handles in the event list 222 terminates. In response, the thread 224 removes the client handle from the list and performs a conditional shutdown of the server process 200 in accordance with the steps summarized in FIG. 5. Having described an exemplary program structure for the event processing thread 224, it is noted that this structure is merely one of many potential ways to manage the operation of the server process 200 in view of a changing set of client processes referencing the server process 200 based upon a registration procedure that adds a unique system identification to a list maintained by the server process 200 when each client process initially requests an interface to the server process 200.

In an embodiment of the invention, the only time a client is removed from the event list 222 is when the server process 202 receives notification from the operating system, via a client process status change notification, that the client process is no longer running. Thus, a client process handle remains in the event list even after the client process 200 has released all references/interfaces to the server process 202. However, in alternative embodiments of the invention, the stub 210 or any other suitable component of the client process 200 or server process 202 recognizes that a client process has released all references and generates an event to cause the client process 200's handle to be deleted from the event list 222. Such case would be beneficial in the case where the list of client handles in the event list 222 is used as a measure of concurrent users while enforcing a concurrent licensing agreement.

It will be appreciated by those skilled in the art that a new and useful method and system for managing client/server processes in a component object-based application execution environment. In view of the many possible computing environments to which the principles of this invention may be applied and the flexibility of carrying out specified functions using a variety of structures and process steps, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer-implemented method for managing client processes and a server process referenced by the client processes, the method comprising:
   maintaining an event list comprising:
      client identifications corresponding to the client processes; and
      event identifications corresponding to client processes that have active references to the server process;
   receiving an initial request from a client process for a service provided by the server process, and in response to receiving the initial request:
      establishing a communication interface for communicating between the client process and the server process;
      initiating by the client process through a special purpose interface provided by the server process a client process registration procedure, the registration procedure comprising:
         adding a client process identification corresponding to the client process to the event list;
         adding, to the event list, a new client event identification corresponding to an initiation of the client process in the server;
      entering a new wait state by the server process associated with the client process;
      receiving a notification that the client process has terminated, and in response to receiving the notification that the client process has terminated:
         emerging from the wait state by the server process; and
         removing the client process identification corresponding to the client process from the event list; and
   performing a server process operation in response to a change to the event list, wherein the server process operation manages at least one of a client process and a server process.

2. The computer-implemented method of claim 1 wherein the change to the list comprises removing a last client process identification, and wherein the performing a server process operation comprises initiating shutting down the server process.

3. The computer-implemented method of claim 1 wherein the change to the list comprises adding a new client process identification, and wherein the performing a server process operation comprises enforcing a concurrent user license limitation upon the number of client processes that concurrently reference the server process.

4. The computer-implemented method of claim 1 further comprising, in association with the receiving an initial request step, the step of:
   obtaining, from an operating system, the client process identification corresponding to the client process.

5. The computer-implemented method of claim 4 wherein the client process identification comprises a handle.

6. The computer-implemented method of claim 5 wherein the notification that the client process has terminated comprises an event message including the handle.

7. The computer-implemented method of claim 5 wherein the list comprises an event list including the handle corresponding to the client process.

8. The computer-implemented method of claim 7 wherein the performing step is carried out by a thread within the server process that waits upon events identified within the event list.

9. The computer-implemented method of claim 8 wherein the events comprise a new client process event associated with adding a new client process handle to the event list.

10. The computer-implemented method of claim 8 wherein the events comprise a shutdown event that is triggered after all client processes release their references to the server process.

11. The computer-implemented method of claim 1 further comprising the steps of:
   inserting a client handler component into the client process;
   issuing, by the client handler component, a message to the server process including a client process identification; and
   issuing a request to an operating system for a notification message corresponding to a change in status of the client process, and in response receiving the client process identification.

12. The computer-implemented method of claim 1 further comprising the steps of:

detecting that the client process has already established an interface to the server process and in response bypassing the adding step.

13. A computer storage medium storing computer-executable instructions for managing client processes and a server process referenced by the client processes, the computer-executable instructions, when executed on a computing device, facilitating executing the steps of:
maintaining an event list comprising:
client identifications corresponding to the client processes; and
event identifications corresponding to client processes that have active references to the server process;
receiving an initial request from a client process for a service provided by the server process, and in response to receiving the initial request:
establishing a communication interface for communicating between the client process and the server process;
initiating by the client process through a special purpose interface provided by the server process a client process registration procedure, the procedure comprising:
adding a client process identification corresponding to the client process to the event list;
adding, to the event list, a new client event identification corresponding to an initiation of the client process in the server;
entering a new wait state by the server process associated with the client process;
receiving a notification that the client process has terminated, and in response to receiving the notification that the client process has terminated:
emerging from the wait state by the server process; and
removing the client process identification corresponding to the client process from the event list; and
performing a server process operation in response to a change to the event list, wherein the server process operation manages at least one of a client process and a server process.

14. The computer storage medium of claim 13 wherein the change to the list comprises removing a last client process identification, and wherein the performing a server process operation comprises initiating shutting down the server process.

15. The computer storage medium of claim 13 wherein the change to the list comprises adding a new client process identification, and wherein the performing a server process operation comprises enforcing a concurrent user license limitation upon the number of client processes that concurrently reference the server process.

16. The computer storage medium of claim 13 further comprising computer-executable instructions, when executed on a computing device, facilitating executing, in association with the receiving an initial request step, the step of:
obtaining, from an operating system, the client process identification corresponding to the client process.

17. The computer storage medium of claim 16 wherein the client process identification comprises a handle.

18. The computer storage medium of claim 17 wherein the notification that the client process has terminated comprises an event message including the handle.

19. The computer storage medium of claim 17 wherein the list comprises an event list including the handle corresponding to the client process.

20. The computer storage medium of claim 19 wherein the performing step is carried out by a thread within the server process that waits upon events identified within the event list.

21. The computer storage medium of claim 20 wherein the events comprise a new client process event associated with adding a new client process handle to the event list.

22. The computer storage medium of claim 20 wherein the events comprise a shutdown event that is triggered after all client processes release their references to the server process.

23. The computer storage medium of claim 13 further comprising computer-executable instructions, when executed on a computing device, facilitating executing the steps of:
inserting a client handler component into the client process;
issuing, by the client handler component, a message to the server process including a client process identification; and
issuing a request to an operating system for a notification message corresponding to a change in status of the client process, and in response receiving the client process identification.

24. The computer storage medium of claim 13 further comprising computer-executable instructions, when executed on a computing device, facilitating executing the steps of:
detecting that the client process has already established an interface to the server process and in response bypassing the adding step.

25. A system facilitating managing execution of client processes and a referenced server process, the system comprising a computer storage medium stored thereon a server component, the server component including:
an event list for storing client identifications corresponding to client processes and event identifications, the event list comprising;
client identifications corresponding to the client processes; and
event identifications corresponding to client processes that have active references to the server process;
a new client procedure, initiated by the client process through a special purpose interface provided by the server process, for adding, to the event list, a client process identification corresponding to a client process referencing the server process, wherein the client process and the server process communicate through a communication interface; adding, to the event list, a new client event identification corresponding to an initiation of the client process in the server;
and entering a new wait state by the server process associated with the client process;
a removed client procedure for emerging from the wait state and deleting, from the list, the client process identification in response to receiving a notification that the client process has terminated; and
an event processor that executes at least one server process operation in response to a change to the event list, wherein the server process operation manages at least one of a client process and a server process.

26. The system of claim 25 wherein the change to the list comprises removing a last client process identification, and wherein the server process operation comprises initiating shutting down the referenced server process.

27. The system of claim 25 wherein the change to the list comprises adding a new client process identification, and wherein the performing at least one server process operation comprises enforcing a concurrent user license limitation upon the number of client processes that concurrently reference the server process.

28. The system of claim 25 wherein the new client procedure includes a call to an operating system to obtain the client process identification corresponding to the client process.

29. The system of claim 28 wherein the client process identification comprises a handle.

30. The system of claim 29 wherein the notification that the client process has terminated comprises an event message including the handle.

31. The system of claim 29 wherein the list comprises an event list including the handle corresponding to the client process.

32. The system of claim 31 wherein the event processor comprises a thread that waits upon events identified within the event list.

33. The system of claim 32 wherein the events comprise a new client process event associated with adding a new client process handle to the event list.

34. The system of claim 32 wherein the events comprise a shutdown event that is triggered after all client processes release their references to the server process.

35. The system of claim 25 further comprising:
- a server/client set-up procedure for inserting a client handler component into the client process, and wherein the client handler includes a call to an interface of the referenced server process providing a client process identification to the referenced server process; and
- wherein the server component includes a call requesting an operating system for a notification message corresponding to a change in status of the client process, and in response receiving the client process identification.

36. The system of claim 25 further comprising a client proxy incorporated into the client process and a server stub incorporated into the referenced server process facilitating communication between the client process and referenced server process.

37. The system of claim 25 wherein the client process and the referenced server process reside upon a single local computer.

\* \* \* \* \*